United States Patent Office 3,499,053
Patented Mar. 3, 1970

3,499,053
SEPARATION PROCESS
William J. Asher, Cranford, David S. Hirshfeld, Union, and Eli Cutler, Somerville, N.J., assignors to Esso Research and Engineering Company, a corporation of Delaware
No Drawing. Filed Nov. 10, 1965, Ser. No. 507,640
Int. Cl. B01j 9/02; C07c 7/12
U.S. Cl. 260—674                              12 Claims

ABSTRACT OF THE DISCLOSURE

Feed to an adsorption separation zone is introduced in accordance with a ramp function; i.e., the rate of feed is varied with time until a desired steady state value is obtained. In a preferred embodiment, the feed is introduced at a very decreased rate, initially, and then increased until the desired steady state value is obtained. By operating in accordance with the disclosure hereof, the problems of "bedlifting" and premature feed breakthrough are avoided.

The present invention is concerned with improving the overall efficiency of a molecular sieve separation process. More particularly, this invention relates to an improved method of introducing feedstock into a molecular sieve separation zone. This improvement relates to the gradual or ramp function introduction of feedstock into an adsorption zone containing a displacing agent in order to prevent breakthrough of feed components at the start of adsorption. Preferably, the adsorption zone is a molecular sieve separation zone although an adsorbent such as silica gel may be utilized.

It has been known for some time that certain zeolites, both naturally occurring and synthetic, have the property of separating normal from isomeric branched-chain paraffins and olefins as well as cycloparaffin and aromatic admixtures. The zeolites have crystal patterns such as deformed structures containing a large number of small cavities interconnected by a number of still smaller holes or pores, the latter being of exceptionally uniform size. Only molecules small enough to enter the pores can be adsorbed, though not all molecules, even though small enough to enter the pores will be adsorbed. An affinity of the molecule for the adsorbent must be present. The pores may vary in diameter from 3 to 6 A. units to 8 to 15 or more A. units, but it is a property of these zeolites or molecular sieves that for a particular size the pores are of substantially uniform size. The adsorbents with pore sizes of 8 to 15 A. units have a high selectivity for aromatics and non-normal hydrocarbons whereas the smaller adsorbents with respect to pore size, that is to say, about 3 to 6 A. units have a selectivity for straight-chain compounds such as normal paraffins and normal olefins. The adsorbents with pore sizes above 7 A. units are known as type X sieves.

The scientific and patent literature contains numerous references to the adsorbing action of natural and synthetic zeolites. Among the natural zeolites having this sieve property may be mentioned chabazites and analcite. A synthetic zeolite with molecular sieve properties is described in U.S. Patent 2,442,191. An example of a class of synthetic zeolites which is used to separate normal hydrocarbons from branched hydrocarbons is type A sieve with divalent cations from the alkaline earth elements, particularly calcium A. These adsorbents are described in U.S. Patent 2,882,243. An example of a class of adsorbents which is used to separate aromatics and non-hydrocarbons from saturates is type X sieve with monovalent and divalent cations from the alkaline and alkaline earth sieves, particularly sodium and calcium type X. These adsorbents are described in U.S. Patent 2,882,244. Zeolites vary somewhat in composition but generally contain silica, aluminum, oxygen and an alkali and/or alkaline earth element, e.g. sodium and/or calcium, magnesium, etc. Analcite has the empirical formula: $NaAlSi_2O_6 \cdot H_2O$. Barrer, in U.S. Patent 2,306,610 teaches that all or part of the sodium is replaceable by calcium to yield on dehydration, a molecular sieve having the formula: $(CaNa_2)Al_2Si_4O_{12} \cdot 2H_2O$. A large number of other naturally occurring zeolites having molecular sieve activity, i.e. the ability to adsorb a straight-chain hydrocarbon and exclude the branched-chain isomers are described in an article "Molecular Sieve Separation of Solids" appearing in Quarterly Reviews, vol. 3, 293–330 (1949) and published by The Chemical Society (London).

The separation of normal from branched-chain or aromatic hydrocarbons or mixtures, either for the purpose of enriching the mixture in the branched-chain, cyclic or aromatic components, or for isolating and recovering the normal isomer, has become increasingly important in industry. Thus, in the preparation of jet and diesel fuels, the presence of normal paraffins degrades the freezing point rating. On the other hand, in the manufacture of synthetic detergents such as alkyl aryl sulfonates, a straight-chain alkyl substituent makes for a better detergency and biodegradable characteristics than a branched-chain constituent of the same number of carbon atoms. Such detergents can be prepared using normal paraffins or normal olefins. The separation of aromatics is also important for numerous reasons; examples of this would include building blocks to be used in producing valuable materials such as polystyrene.

More recently, additional sieves have come into existence; they include the type Y variety. It should be emphasized that this invention is equally applicable to all molecular sieves. This invention is also applicable to other adsorbents such as silica gel, charcoal, etc. Molecular sieves will be used as an example for the general class of adsorbents.

After a molecular sieve has been utilized for adsorption of a given component whether it be aromatic or a normal paraffin or normal olefin, the sieve must be desorbed. This is done to recover the adsorbed material and to put the sieve in condition for further adsorption cycles. A variety of methods have been proposed for the desorption of a molecular sieve. One of the more widely used methods involves the use of vacuum. It is also known to raise the temperature around the molecular sieve separation zone and this may be done in conjunction with vacuum or as an independent means of desorbing the sieve. Steam has also been used as a method of desorbing a molecular sieve but this has led to a great deal of difficulty since the sieves are not steam stable and tend to collapse. It is therefore preferred to make use of a displacing agent to desorb the molecular sieve.

The displacing agent is defined as a polar or polarizable material having an appreciable affinity for the zeolitic adsorbent compared with the material desired to be desorbed. The displacing agent will generally have a heat of adsorption approximately equal to the material it is desired to desorb. Other commonly used terms to describe displacing agents are desorbents and desorbing mediums. Suitable displacing agents for purposes of this invention include $SO_2$, ammonia, carbon dioxide, $C_1$ through $C_5$ alcohols such as methanol and propanol, glycols such as ethylene glycol and propylene glycol, halogenated compounds such as methyl chloride, ethyl chloride, methyl fluoride, nitrated compounds such as nitromethane and the like. Preferably, the displacing agents are used in the gaseous state but they may also be used in liquid form. By far, the most successful displacing agent has the general formula:

wherein $R_1$, $R_2$ and $R_3$ are selected from the group consisting of hydrogen and the $C_1$ through $C_5$ alkyl radicals.

Thus, the class of desorbing materials includes ammonia and $C_1$ through $C_5$ primary, secondary and tertiary amines with ammonia being preferred and a $C_1$ through $C_5$ primary amine being next in order of preference. Examples of preferred primary amines include ethylamine, methylamine, butylamine and the like. Of course the displacing agent used must have its critical dimensions small enough to enter the molecular sieve being used. The preferred displacing agent is equally capable of removing aromatices as it is aliphatics which are adsorbed onto a molecular sieve bed. For the desorption of aliphatics, $R_2$ and $R_3$ must be hydrogen.

After the displacing agent has been utilized to desorb the adsorbed component, a new cycle is then started. The new cycle commences with the reintroduction of an adsorbing agent into the molecular sieve separation zone. This reintroduction of feedstock has resulted in a considerable problem. As soon at the feedstock is reintroduced into the molecular sieve separation zone, there is almost immediate breakthrough of feed components. Needless to say, this results in a loss of desirable product as well as a co-mingling of the displacing agent with the feedstock. In the case where the sieve bed effluent is the desired product, it is contaminated with the components, which under equilibrium conditions, would have been adsorbed. Accompanying this is the problem of bed lift in which the molecular sieve bed is subjected to very rapid agitation and lifting. Bed lifting is intolerable from a practical standpoint. Shifts of bed material result in mal-distribution of feed and poor utilization of the adsorbent. The adsorbent abrades and attrites to smaller particles which are carried out of the vessel, plugging lines or pumps, and posing risks to expensive equipment as well as depleting the adsorbent inventory in the vessel. This latter makes for yet more mal-distribution of flow when bed material shifts and shortens cycle lengths rapidly toward the practical minimum.

According to this invention, it has unexpectedly been found that a ramp function introduction of feedstock into a molecular sieve separation zone which contains displacing agent prevents the breakthrough of feed components at the start of adsorption and also reduces the ΔP over the bed and prevents bed lifting. By ramp function it is meant the introduction of material into a molecular sieve separation zone at a very decreased rate initially and then increasing the rate of introduction in some pattern with time until a substantially steady state value is obtained. It is convenient to have this pattern linear with time, however, this is not essential.

The following is offered as an explanation for the mechanism by which the instant invention operates; it should be emphasized that there is no intention to be bound by any mechanism and this is offered only as a possible explanation. In alternate displacement adsorption cycles, the rapid liberation of displacing agent at the start of adsorption is due to two mechanisms. Initially displacing agent is liberated because the reduction of the partial pressure of the displacing agent from the total desorption pressure to the partial pressure of displacing agent in the feed. An additional cause is the adsorption of feed components onto the adsorbent with the subsequent rapid liberation of the displacing agent. Using a 5 A. molecular sieve and normal paraffin as the adsorbed component, as an example, it is seen that the adsorption of normal paraffins inside the sieve crystals with the subsequent rapid liberation of previously adsorbed displacing agent causes bed lifting. In a ramp function, the initial and final rates of introduction are different; either can be higher. If the final rate is higher, it is called positive; if the final rate is lower, it is called negative. The rate of introduction changes in some pattern with time. It is convenient to have this pattern linear with time.

By introducing the feed as a ramp function wherein the rate of feed brought in is quite low initially, the liberation of displacing agent is also quite low. In addition, the rate of liberation of displacing agent because of the reduction in partial pressure is also reduced since the partial pressure is changed over a smaller portion of the adsorbent bed per unit of time in the initial portion of adsorption.

A variation of the introduction of feedstock as a ramp function includes the introduction of displacing agent along with the feedstock. If the two are added together, both may be introduced as a ramp function thereby maintaining a constant mole ratio between the two. A variation of this would include starting the absorption cycle with displacing agent only and then introducing feedstock in a ramp function while the displacing agent enters at a constant rate. As another alternative, the displacing agent, when introduced along with the feed, can be initially introduced at a high level and then decreased gradually in the form of a negative ramp function. This negative ramp function can end at a zero rate if no displacing agent is desired in the feed. Another alternative would be to introduce the displacing agent at a high rate to be followed by a negative ramp function to a lower rate. The feed is introduced at a low rate at the same time the displacing agent is introduced; this is to be followed by a positive ramp to a higher feed rate.

When introducing the displacing agent as a negative ramp function and the feedstock at a substantially constant rate, the following conditions must be utilized. The mole ratio of displacing agent to feedstock at the time of initial introduction is at least 0.3. The rate of introduction of the feedstock, as mentioned previously, stays substantially constant; the displacing agent is decreased at a rate of between 5 and 300% of the ratio, at the time of introduction, per minute. The final mole ratio of displacing agent to feedstock is no greater than 80% of the ratio at the time of introduction. It is, of course, within the scope of this invention to reduce the displacing agent down to a point where there is no longer any displacing agent being introduced along with the feedstock.

In more detail, a displacing agent, which for purposes of example will be ammonia, is used to displace either normal hydrocarbons or aromatics from a molecular sieve bed. For as mentioned previously, this invention is equally applicable to both type A and type X molecular sieves as well as any other sieves which might be utilized for adsorption. When the bed is substantially desorbed, it is loaded with ammonia. To replace this ammonia, fresh feed has to be introduced into the bed again. If this feed is introduced in a step fashion, that is to say, immediately at the ultimate rate at which it will be introduced, an explosion in the bed is possible and breakthrough of otherwise adsorbable hydrocarbons is also most probable. To prevent this, according to the teachings of this invention a ramp function is utilized. The feed is introduced originally at a rate of 0 to 65% of ultimate rate. The rate of introduction of feedstock is increased at a rate of 5 to 35% of cycle average feed rate per minute. At the end of this time, the feedstock is being passed over the bed at ultimate cycle feed rate. This is the maximum rate utilized and it is continued until the bed is substantially saturated with the adsorbable hydrocarbon and this hydrocarbon appears in substantial concentrations in the effluent. At this time the bed is again desorbed with a displacing agent which in its preferred form will be ammonia. In this way, the problems with bed lift and immediate product breakthrough are substantially solved.

All feedstocks which are capable of being adsorbed onto a molecular sieve bed may be treated by the instant invention. Thus, separations of normal olefins and normal paraffins, especially $C_4$–$C_{40}$ normal paraffins, onto a type A molecular sieve bed and in particular a type 5 A. molecular sieve bed may be effected. Additionally, the separation of aromatics onto a type X molecular sieve bed, having pore openings of at least 7 A., particularly a 10X or 13X bed may be improved by the process of the instant invention.

As for conditions other than those at which the feedstock must be introduced into a bed loaded with displacing agent, the operation is to be conducted in the vapor phase preferably but liquid is also satisfactory. Temperatures for adsorption should be maintained within a range of about 200° to 1000° F., preferably 500° to 850° F. and most preferably 500° to 800° F. The pressure during adsorption may vary within wide ranges but should be between 1 and 100 p.s.i.a., preferably 10 to 50 p.s.i.a. and most preferably 15 to 50 p.s.i.a. The amount of feed to be introduced per cycle should vary between 0.01 and 10 w./w., preferably 0.1 to 5 w./w. and most preferably 0.15 to 1.0 w./w. The feed will be introduced in a ramp function fashion. The initial rate of introduction for the feedstock will vary between 0 and 65% of cycle average feed rate. This rate will be increased at a rate of 5 to 100% of ultimate feed rate per minute until ultimate cycle feed rate is reached.

The ultimate cycle feed rate which is eventually reached will vary depending on whether a type A or type X molecular sieve is being utilized. For a type A molecular sieve, which will be utilized to separate normal paraffins from admixture, the ultimate rate may vary between 0.1 to 10 w./w./hr., preferably 0.5 to 4.0 w./w./hr. In the case of an aromatic separation utilizing a tape X sieve, the ultimate cycle rate will vary between 0.1 and 100 w./w./hr., preferably 1 to 20 w./w./hr. The respective rates outlined above may be utilized for all separations involving type A and type X sieves. With respect to desorption, the preferred displacing agent, ammonia, is to be introduced at a temperature of 500° to 800° F. and a pressure of 15 to 50 p.s.i.a. Ammonia is introduced at a rate of 0.1 to 10.0 weight of $NH_3$ per weight of sieve per hour. The adsorption cycle will vary between 3 and 30 minutes, desorption will vary between 3 and 30 minutes.

In a preferred embodiment of this invention, a $C_{11}$ to $C_{14}$ normal paraffin cut is separated from an admixture which includes one constituent from the group consisting of isoparaffins, cyclic paraffins, aromatics and inorganic constituents. In order to separate the normal paraffin cut, the mixture is introduced into a molecular sieve separation zone wherein a 5 A. molecular sieve is maintained. The bed has previously been loaded with a displacing agent which in the preferred case is ammonia. The feed is introduced into the bed at an initial rate of 40 to 60% of cycle average feed rate. This is increased at a rate of 5 to 20% of ultimate feed rate per minute until a level of about 0.5 w./w./hr. to 4.0 w./w./hr. is reached. The entire adsorption phase lasts for a period of 3 to 30 minutes. During adsorption, the bed is maintained at a temperature of about 500° to 800° F. and a pressure of about 15 to 50 p.s.i.a. At this point, the bed is substantially saturated with normal paraffins and the desorption period is about to begin. Desorption takes place at a temperature of about 500° to 800° F. and a pressure of 15 to 50 p.s.i.a. The displacing agent utilized is ammonia and the rate of introduction ammonia is 0.2 to 1.0 w./w./hr. The desorption phase lasts for about 3 to 30 minutes at which time the bed is substantially desorbed and the next adsorption cycle commences.

EXAMPLE 1

In this example, kerosene containing about 12 to 20% of normal paraffins is introduced into a molecular sieve separation zone. This zone contains molecular sieve held in particles of about 1/16 inch in diameter. The zone contains a Linde 5 A. molecular sieve and is loaded with displacing agent, i.e. ammonia. The zone is maintained at a temperature of 665° F. and a pressure of 20 p.s.i.a. The feed is introduced initially at a rate of 0.5 w./w./hr. This rate is increased at a rate of about 0.2 w./w./hr. per minute until a level of about 1.2 w./w./hr. is passing over the bed. The adsorption period lasts for 20 minutes. At the end of this time, the bed is substantially saturated with normal paraffins and the desorption phase begins. The displacing agent utilized is ammonia. Ammonia is passed over the bed at a temperature of 665° F. for a period of about 20 minutes at a rate of 0.6 w./w./hr. The pressure over the bed does not change appreciably during desorption. The desorption period lasts for about 20 minutes.

The cycle is now complete and fresh feedstock may again be introduced into the molecular sieve separation zone. There is no bed lifting observed during this process and there is no breakthrough of product at the start of the adsorption step. The feed in this example is introduced in a positive ramp function.

EXAMPLE 2

In this example the exact conditions of Example 1 are utilized except that the feedstock is introduced immediately at a rate of 1.2 w./w./hr. This is the ultimate rate utilized in Example 1 but there is no ramp function introduction. Considerable bed lifting is observed. The pressure drop over the entire bed is greater than its weight. The pressure drop over the top increment of bed is many times its weight. In addition, chromatographic analysis indicates that a substantial amount of product has broken through the sieve bed immediately. The chromatographic analysis indicates that normal paraffins are coming out of the bed as effluent in substantial quantities. In this example, the feed is not introduced as a positive ramp function.

EXAMPLE 3

In this example, the same conditions as Example 1 are utilized except that ammonia is initially introduced at the reduced rate of 0.011 w./w./hr. along with the feedstock at the reduced rate. As the feed rate is increased, the $NH_3$ rate is increased at a rate of about 0.006 w./w./hr. per minute so that the ratio of $NH_3$ to feed stays essentially constant. Once again, as in Example 1, no bed lifting is observed and there is no evidence of immediate breakthrough of hydrocarbon from the bed. In this example, the feed is introduced in a positive ramp function and the mole ratio of $NH_3$ to feed stayed constant.

EXAMPLE 4

In this example, the exact conditions of Example 1 are utilized except that the feed is introduced and held at the constant rate of 0.8 w./w./hr. Ammonia is introduced with the feed at the high rate of 0.08 w./w./hr. The ammonia rate is then reduced at a rate of about 0.01 w./w./hr. per minute, in a negative ramp function until the final rate of about 0.03 w./w./hr. is reached. These rates are then held for the remainder of the adsorption. Here again no bed lifting or initial product breakthrough is observed. In this example, the feed is not introduced as a ramp function but the mole ratio of $NH_3$ to feed is decreased with time.

It is also within the scope of this invention to remove inorganic impurities such as sulfur, $O_2$ and $N_2$ with a molecular sieve.

Although this invention has been described with some degree of particularity, it is intended only to be limited by the attached claims.

What is claimed is:

1. An improved molecular sieve separation process which comprises introducing displacing agent into a molecular sieve separation zone wherein the sieve is substantially saturated with displacing agent, introducing a hydrocarbon mixture into said displacing agent-loaded molecular sieve separation zone, said mixture containing at least one adsorbable component, initially introducing said hydrocarbon mixture at a rate of 0 to 65% of ultimate cycle feed rate, increasing the rate of introduction of said hydrocarbon mixture at a rate of 5 to 35% of ultimate feed rate per minute until the ultimate cycle feed rate is of 0.1 to 100 w./w./hr., continuing the passage of said hydrocarbon at ultimate feed rate until a substantial portion of said displacing agent is removed from said molecular sieve separation zone whereby said displacing agent is removed with a reduced tendency to lift the bed in upflow adsorption and without immediate breakthrough of said adsorbable component.

2. The process of claim 1 wherein said adsorbable component is a normal paraffin and said molecular sieve is a 5 A. molecular sieve, and the ultimate feed rate is between 0.5 and 4.0 w./w./hr.

3. The process of claim 1 wherein said adsorbable hydrocarbon is an aromatic and said molecular sieve is a molecular sieve having a pore opening of at least 7 A.

4. The process of claim 1 wherein said displacing agent has the formula:

wherein $R_1$, $R_2$ and $R_3$ are selected from the group consisting of hydrogen and $C_1$ to $C_5$ normal paraffins.

5. The process of claim 2 wherein the displacing agent has the general formula:

wherein $R_1$ is selected from the group consisting of hydrogen and $C_1$ to $C_5$ normal paraffins.

6. An improved method for removing displacing agent from a molecular sieve separation zone with a reduction in the tendency for the bed to lift with an upflow adsorption in the absence of immediate breakthrough of adsorbable hydrocarbon which comprises loading a 5 A. molecular sieve with ammonia, until said sieve is substantially saturated, introducing a gas phase feedstock into said molecular sieve separation zone, said feedstock containing normal paraffins and at least one constituent selected from the group consisting of isoparaffins, cyclic paraffins, and aromatics at a rate of 40 to 60% of the ultimate feed rate, increasing the rate of introducing of said hydrocarbon at a rate of 5 to 20% of ultimate rate per minute, continuing to increase the rate of introduction of said hydrocarbon for a period of 3 to 8 minutes until the ultimate feed rate level of 0.5 to 4.0 w./w./hr. of hydrocarbon is passing through said bed, continuing to pass hydrocarbon at this rate for 3 to 30 minutes through said bed until said bed contains a substantial amount of normal paraffins.

7. An improved process for separating aromatics from non-aromatic materials in a molecular sieve separation zone of type X which comprises loading said molecular sieve with displacing agent, passing a hydrocarbon mixture containing at least one aromatic component into said molecular sieve zone at a rate of 0 to 65% of the ultimate rate, increasing the rate of introduction of said hydrocarbon at a rate of 5 to 20% per minute of the ultimate feed rate until the ultimate feed rate of 1 to 20 w./w./hr. is reached, maintaining said rate of 1 to 20 w./w./hr. until a substantial portion of said displacing agent is removed from said molecular sieve and said sieve is substantially saturated with aromatics.

8. The process of claim 7 wherein said displacing agent has the general formula:

wherein $R_1$, $R_2$ and $R_3$ are selected from the group consisting of $C_1$ to $C_5$ alkyl radicals and hydrogen.

9. An improved molecular sieve separation process wherein a feedstock containing at least one component which is adsorbable onto said molecular sieve is introduced along with displacing agent into a molecular sieve separation zone said zone being substantially loaded with displacing agent the improvement which comprises introducing said feedstock at a relatively constant rate, introducing said displacing agent at a rate wherein the mole ratio of displacing agent to feedstock at the time of introduction is at least 0.3, decreasing the rate of introduction of said displacing agent at a rate of between 5 and 300% of the ratio at the time of introduction of said displacing agent until the final ratio of displacing agent to feedstock is less than 80% of the ratio at the time of introduction.

10. The process of claim 9 wherein said adsorbable component is a $C_4$ to $C_{40}$ normal paraffin and said molecular sieve is a type A molecular sieve and the said feedstock is introduced into said molecular sieve separation zone at a rate of 0.1 to 10 w./w./hr.

11. The process of claim 9 wherein said feedstock is an aromatic hydrocarbon, said molecular sieve has pore openings of at least 7 A. and the said feedstock is introduced at a rate of from 0.1 to 100 w./w./hr.

12. The process of claim 9 wherein the said displacing agent has the general formula:

wherein $R_1$, $R_2$ and $R_3$ are selected from the group consisting of hydrogen and $C_1$ through $C_5$ alkyl radicals.

References Cited

UNITED STATES PATENTS

| | | | |
|---|---|---|---|
| 2,529,289 | 11/1950 | Gilliland | 260—674 |
| 3,141,748 | 7/1964 | Hoke et al. | 208—310 |
| 3,176,444 | 4/1965 | Kiyonaga | 208—310 |
| 3,231,631 | 1/1966 | Hicks et al. | 208—310 |

PAUL M. COUGHLAN JR., Primary Examiner

C. E. SPRESSER, Assistant Examiner

U.S. Cl. X.R.

55—75; 208—310; 260—676